US011853953B2

(12) United States Patent
Banerjee (10) Patent No.: US 11,853,953 B2
(45) Date of Patent: Dec. 26, 2023

(54) METHODS AND SYSTEMS PROVIDING AERIAL TRANSPORT NETWORK INFRASTRUCTURES FOR UNMANNED AERIAL VEHICLES

(71) Applicant: The Trustees of Indiana University, Indianapolis, IN (US)

(72) Inventor: Aniruddha Banerjee, Indianapolis, IN (US)

(73) Assignee: The Trustees of Indiana University, Bloomington, IN (US)

( * ) Notice: Subject to any disclaimer, the term of this patent is extended or adjusted under 35 U.S.C. 154(b) by 226 days.

(21) Appl. No.: 17/208,999

(22) Filed: Mar. 22, 2021

(65) Prior Publication Data
US 2022/0058573 A1    Feb. 24, 2022

Related U.S. Application Data

(60) Provisional application No. 63/015,112, filed on Apr. 24, 2020.

(51) Int. Cl.
*G08G 5/00* (2006.01)
*G06Q 10/0835* (2023.01)
(Continued)

(52) U.S. Cl.
CPC ..... *G06Q 10/0832* (2013.01); *G06Q 10/0833* (2013.01); *G06Q 10/08355* (2013.01);
(Continued)

(58) Field of Classification Search
CPC .......... G06Q 10/08355; G08G 5/0034; G08G 5/0069
(Continued)

(56) References Cited

U.S. PATENT DOCUMENTS

2016/0284221 A1 * 9/2016 Hinkle ................. G08G 5/0026
2018/0038695 A1 * 2/2018 Bitra .................... G08G 5/0021
(Continued)

FOREIGN PATENT DOCUMENTS

WO    WO-2020247647 A1 * 12/2020 ........... B64C 39/024

OTHER PUBLICATIONS

B. Balázs et al., "Coordinated Dense Aerial Traffic with Self-Driving Drones," 2018 IEEE International Conference on Robotics and Automation (ICRA), Brisbane, QLD, Australia, 2018, pp. 6365-6372. (Year: 2018).*
(Continued)

*Primary Examiner* — Jeff Zimmerman
*Assistant Examiner* — Hunter A Molnar
(74) *Attorney, Agent, or Firm* — Hartman Global IP Law; Gary M. Hartman; Domenica N. S. Hartman (57) ABSTRACT

Technologies are disclosed herein for providing an aerial transport network infrastructure for unmanned aerial vehicles, such as drones. The transport network infrastructure comprises models built from publicly available information, such as Federal Communications Commission and Department of Transportation (FCC-DOT) map data. An Electric Regulated Drone Operating System (ERDOS) executing within a drone includes logic for routing, queuing, monitoring, and rescuing using Level 5 automation techniques within the aerial transport network infrastructure.

9 Claims, 5 Drawing Sheets

(51) Int. Cl.
 *G06Q 10/0832* (2023.01)
 *G06Q 10/0833* (2023.01)

(52) U.S. Cl.
 CPC ......... *G08G 5/0013* (2013.01); *G08G 5/0034* (2013.01); *G08G 5/0069* (2013.01); *G08G 5/0082* (2013.01)

(58) Field of Classification Search
 USPC .......................................................... 705/332
 See application file for complete search history.

(56) References Cited

U.S. PATENT DOCUMENTS

| | | | |
|---|---|---|---|
| 2019/0155314 A1* | 5/2019 | DeBitetto | G01C 21/005 |
| 2020/0258400 A1* | 8/2020 | Yuan | G06V 20/10 |
| 2020/0286392 A1* | 9/2020 | Miller | G05D 1/101 |
| 2022/0003569 A1* | 1/2022 | Maeda | G05D 1/0274 |

OTHER PUBLICATIONS

T. Castelli, et al., "Autonomous navigation for low-altitude UAVs in urban areas," Feb. 25, 2016. pp. 1-6. https://arxiv.org/abs/1602.08141. (Year: 2016).*

* cited by examiner

METHODS AND SYSTEMS PROVIDING AERIAL TRANSPORT NETWORK INFRASTRUCTURES FOR UNMANNED AERIAL VEHICLES

This is a non-provisional patent application.

FIELD

The present disclosure relates generally to aerial autonomous vehicles, and more specifically to a framework and techniques for providing a transportation network infrastructure for aerial autonomous vehicles.

BACKGROUND

Attempts at developing a framework for aerial unmanned vehicles, such as drones, have generally been inspired by Federal Aviation Administration (FAA)- and National Aeronautics and Space Administration (NASA)-led initiatives. For example, drone delivery is a concept that leverages such initiatives by routing drone systems to deliver goods to consumers and organizations. However, despite such approaches, concerns still remain regarding safety, adherence to government regulations, and practical considerations. For example, present FAA regulations limit drone-type aerial vehicles to fly between 200 and 400 feet above ground level, with no flying over private property or human beings.

SUMMARY

Embodiments presented herein disclose systems and methods for providing an aerial transport network infrastructure for unmanned aerial vehicles, such as drones. The transport network infrastructure comprises models built from publicly available information, such as Federal Communications Commission and Department of Transportation (FCC-DOT) map data. An Electric Regulated Drone Operating System (ERDOS) executing within a drone includes logic for routing, queuing, monitoring, and rescuing using Level 5 automation techniques within the aerial transport network infrastructure.

DESCRIPTION OF THE ILLUSTRATIVE EMBODIMENTS

For the purposes of promoting an understanding of the principles of the present disclosure, reference will now be made to a number of illustrative embodiments shown in the attached drawings and specific language will be used to describe the same.

Embodiments presented herein disclose an aerial transportation network infrastructure for unmanned aerial vehicles (e.g., aerial drone vehicles) and techniques for operating within the transportation network infrastructure. More particularly, embodiments provide a routing infrastructure that builds a sky-based transport model based on ground road network map data, such as United States Department of Transportation (DOT) mapping data, which includes over 49 million road segments and 40 million nodal intersections across the United States. Such mapping data may include topologically-integrated street files developed by public sources, such as the DOT (as well as state-level and other local DOTs), shipping networks such as the United States Postal Service (USPS), the United States Census Bureau, and the United States Geological Survey (USGS). Further, techniques provide for augmenting the mapping data to allow for Sigma 5 precision such that no drones configured within the infrastructure are to come within five feet of any object (e.g., buildings, trees, other environmentally-related object).

Further, embodiments also provide a software application framework for allowing aerial drones to navigate through the infrastructure based on terrestrial navigation techniques. In an embodiment, the framework provides Level 5 automation techniques for routing, queueing, and rescue management for drones operating within the infrastructure. The framework further includes real-time simulation models to predict potential issues and solve these issues prior to any failure occurring from the potential issues, applying measures based on the terrestrial navigation techniques.

Further, the present approach may yield various applications beyond generating the transportation network to reduce cost of delivery, reduce the amount of freight deliveries conducted, increase commerce, and reduce pollution associated with delivery. One such application includes managing Federal Communications Commission (FCC) spectrum type auctions to determine access to particular portions of airspace dedicated to drone flight above roads at over a given amount of feet (e.g., over 300 feet). Doing so allows local governments to determine borders for airspace to help local safety mechanisms (e.g., deploying air traffic management mechanisms to serve rescue and rogue drone detention tasks). Another application may include generating prototype simulations for replicating (traffic safety) DOT-style traffic in a sky setting to evaluate feasibility for a given portion of airspace dedicated to drone flight. Yet another application may include services used to sell or host drone traffic and equipment based on marketplace regulations (e.g., such as those applied in the automobile industry or spectrum space ownership by telecommunications operators).

Figure 1:
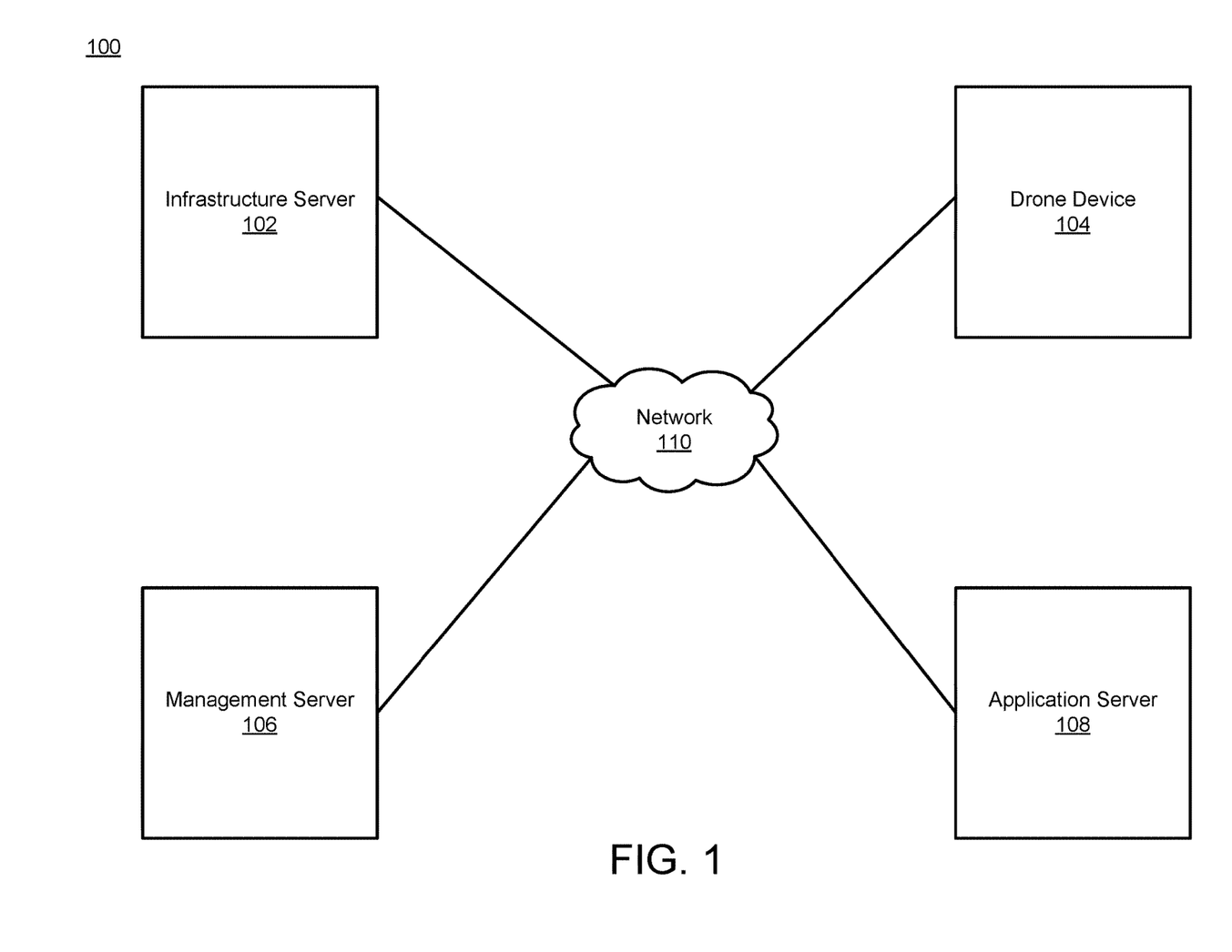
FIG. 1 illustrates an example computing environment in which an aerial drone operates within a transportation network infrastructure, according to an embodiment.

Referring now to FIG. 1, a computing environment 100 includes one or more infrastructure servers 102, drone devices 104, management servers 106, and application servers 108, each interconnected by a network 110 (e.g., the Internet). In an embodiment, the infrastructure servers 102 may include configuration logic for generating infrastructure models used by the drone devices 102 for navigation. Generally, the infrastructure models, representative of an aerial transportation network infrastructure, may be built from publicly available ground infrastructure data, such as that provided electronically by the DOT. The drone devices 102 may be embodied as any aerial unmanned vehicle capable of some degree of autonomous activity, such as Level 5 automation. The management servers 106 allow users to configure various settings of the infrastructure servers 102 or the drone devices 104. The application servers 108 may provide various services pertaining to the aerial transportation network infrastructure. Examples include simulation services, auction services, and drone production services.

Figure 2:
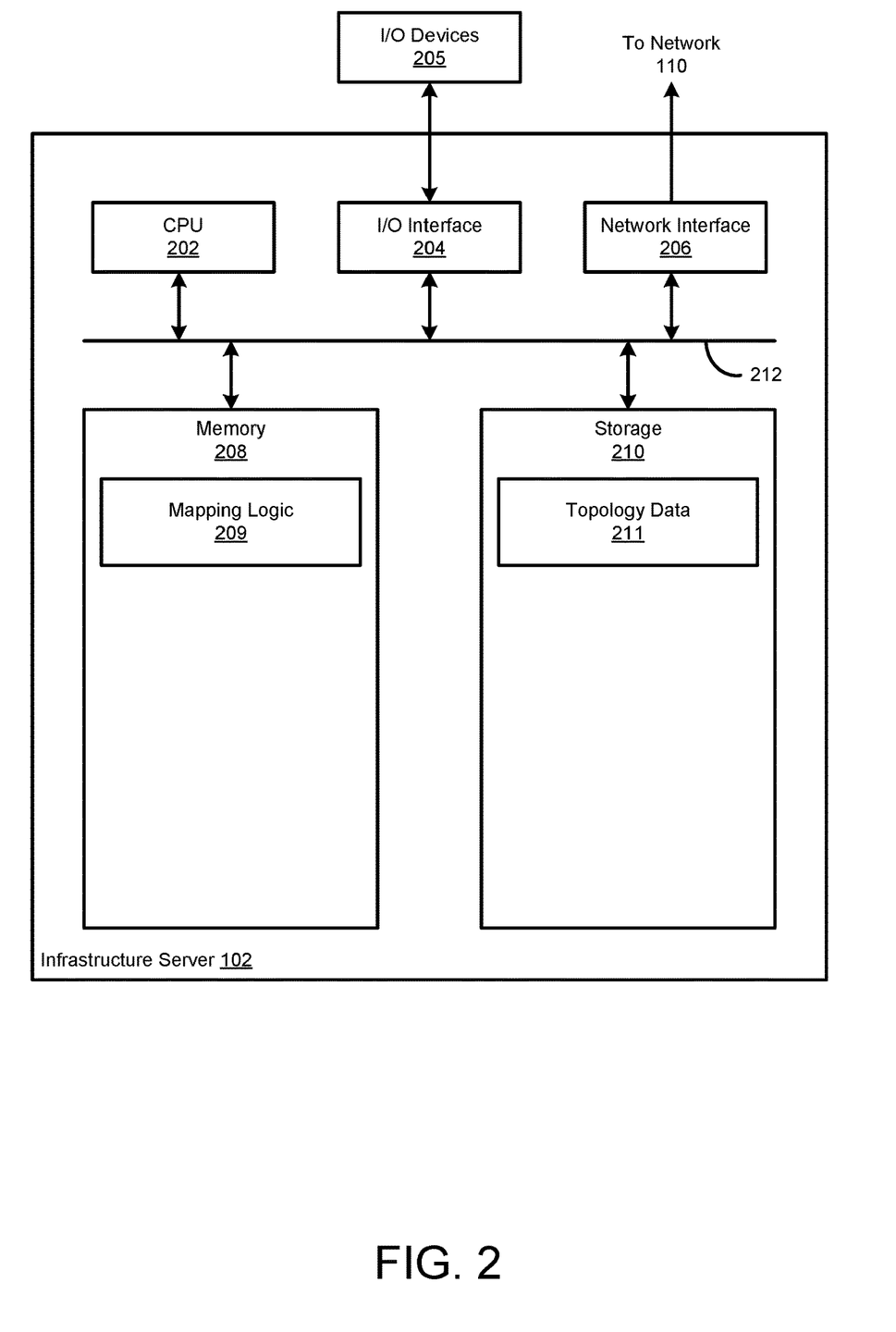
FIG. 2 illustrates an example of an infrastructure server configured to provide the transportation network infrastructure described relative to FIG. 1, according to an embodiment.

Referring now to FIG. 2, an example of components of a infrastructure server 102 is shown. As shown, the infrastructure server 102 includes, without limitation, a central processing unit (CPU) 202, an I/O device interface 204, a network interface 206, a memory 208, and a storage 210, each interconnected via an interconnect bus 212. Note, CPU 202 is included to be representative of a single CPU, multiple CPUs, a single CPU having multiple processing cores, and the like. Memory 208 is generally included to be representative of a random access memory. Storage 210 may be a disk drive storage device. Although shown as a single unit, storage 210 may be a combination of fixed and/or removable storage devices, such as fixed disc drives, removable memory cards, or optical storage, network attached storage (NAS), or a storage area network (SAN). The I/O device interface 204 may provide a communications interface with I/O devices 205. The network interface 208 may be embodied as any hardware or circuitry to enable the infrastructure server 102 to communicate over a network (e.g., the network 110).

Illustratively, the memory 208 includes mapping logic 209, which may be embodied as program code to be executed on the CPU 202 to perform an operation including functions described herein, including building an aerial network topology based on publicly available source mapping data (e.g., DOT map data). The storage 210 includes topology data 211, which may be embodied as any data generated by the mapping logic 209 based on the publicly available source mapping data. The topology data 211 generally pertains to an elevated version of ground public road information obtained from the mapping data. The mapping logic 209 may push the topology data 211 to external servers, such as the management servers 106 for redistribution to the drone devices 104. Alternatively (or additional), the mapping logic 209 may transmit the topology data 211 directly to a given drone device 104.

Figure 3:
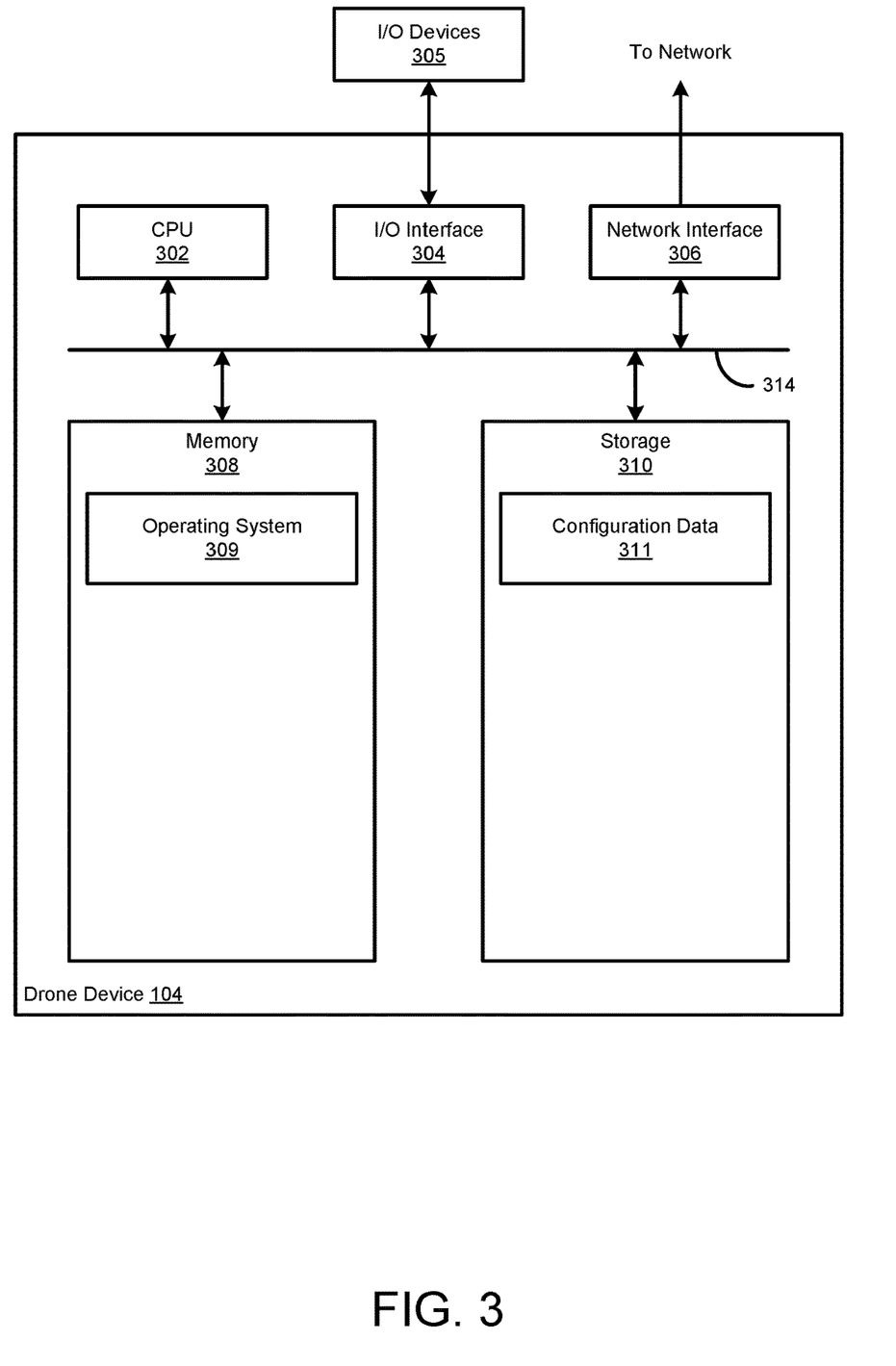
FIG. 3 illustrates an example of an aerial drone configured with logic to operate within the transportation network infrastructure described relative to FIG. 1, according to an embodiment.

Referring now to FIG. 3, an example of components of a drone device 104 are shown, according to an embodiment. As shown, the drone device 104 includes, without limitation, a central processing unit (CPU) 302, an I/O device interface 304, a network interface 306, a memory 308, and a storage 310, each interconnected via an interconnect bus 312. Note, CPU 302 is included to be representative of a single CPU, multiple CPUs, a single CPU having multiple processing cores, and the like. Memory 308 is generally included to be representative of a random access memory. Storage 310 may be a disk drive storage device. Although shown as a single unit, storage 310 may be a combination of fixed and/or removable storage devices, such as fixed disc drives, removable memory cards, or optical storage, network attached storage (NAS), or a storage area network (SAN). The I/O device interface 304 may provide a communications interface with I/O devices 305. The network interface 308 may be embodied as any hardware or circuitry to enable the drone device 104 to communicate over a network (e.g., the network 110).

Illustratively, the memory 308 includes an operating system 309, which may be embodied as program code to be executed on the CPU 302 to perform an operation including functions described herein, including navigating the transportation network infrastructure based on routing data and request data (e.g., such as for delivery sequences). The operating system 309 may use stochastic approximation techniques to accurately predict traffic and allow parameters like driver behavior and signal systems to interact with other drone devices 104 in the infrastructure. The storage 310 includes configuration data 311, which may be embodied as any data used to configure the operation of the drone device 104, such as routing configuration data.

Figure 4:
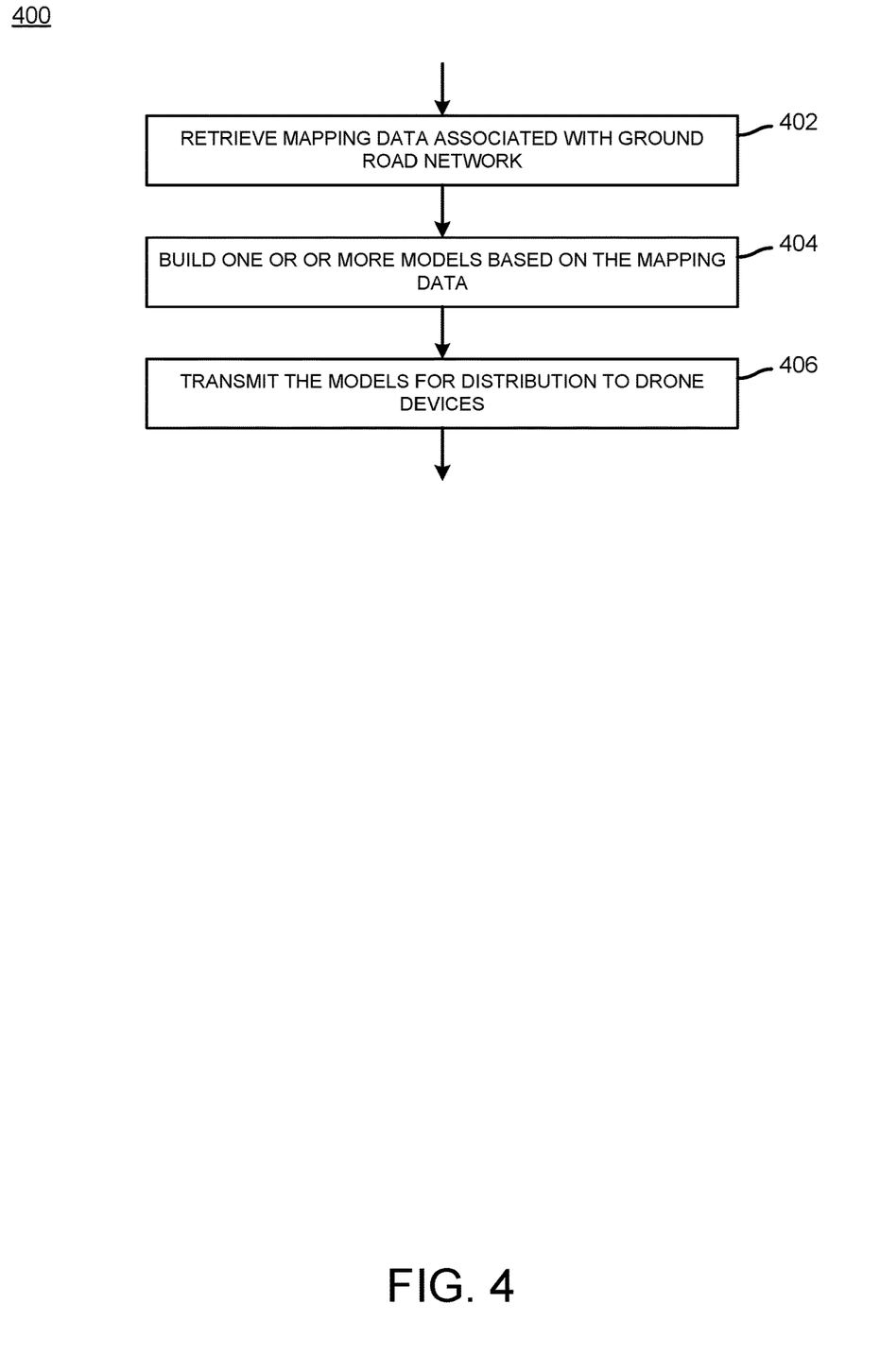
FIG. 4 illustrates a flow diagram of an example method for building a model for an aerial drone to operate within the transportation network infrastructure described relative to FIG. 1, according to an embodiment.

Referring now to FIG. 4, an example method 400 for building a model for an aerial drone to operate within an aerial transportation network infrastructure. As shown, the method 400 begins in block 402, in which the infrastructure server 102 retrieves mapping data associated with a ground network. As an example, the mapping data may be representative of transportation maps provided by publicly available sources, such as the US DOT as well as local DOTs. These maps may comprise digital drawings with sigma 5 precision, such that if adapted to the sky model, no drones will come within a given distance of any object. In block 404, the infrastructure server 102 builds one or more topology models based on the mapping data. For example, the infrastructure server 102 may adapt terrestrial simulation software to generate topology models from the mapping data to apply to an aerial setting. In block 406, the infrastructure server 102 transmits the topology models for distribution to drone devices 104. For example, the infrastructure server 102 may push the topology models to drone devices 104 subscribing for updates to the infrastructure. As another example, the infrastructure may send the topology models to other servers used for providing updates to the drone devices 104.

Figure 5:
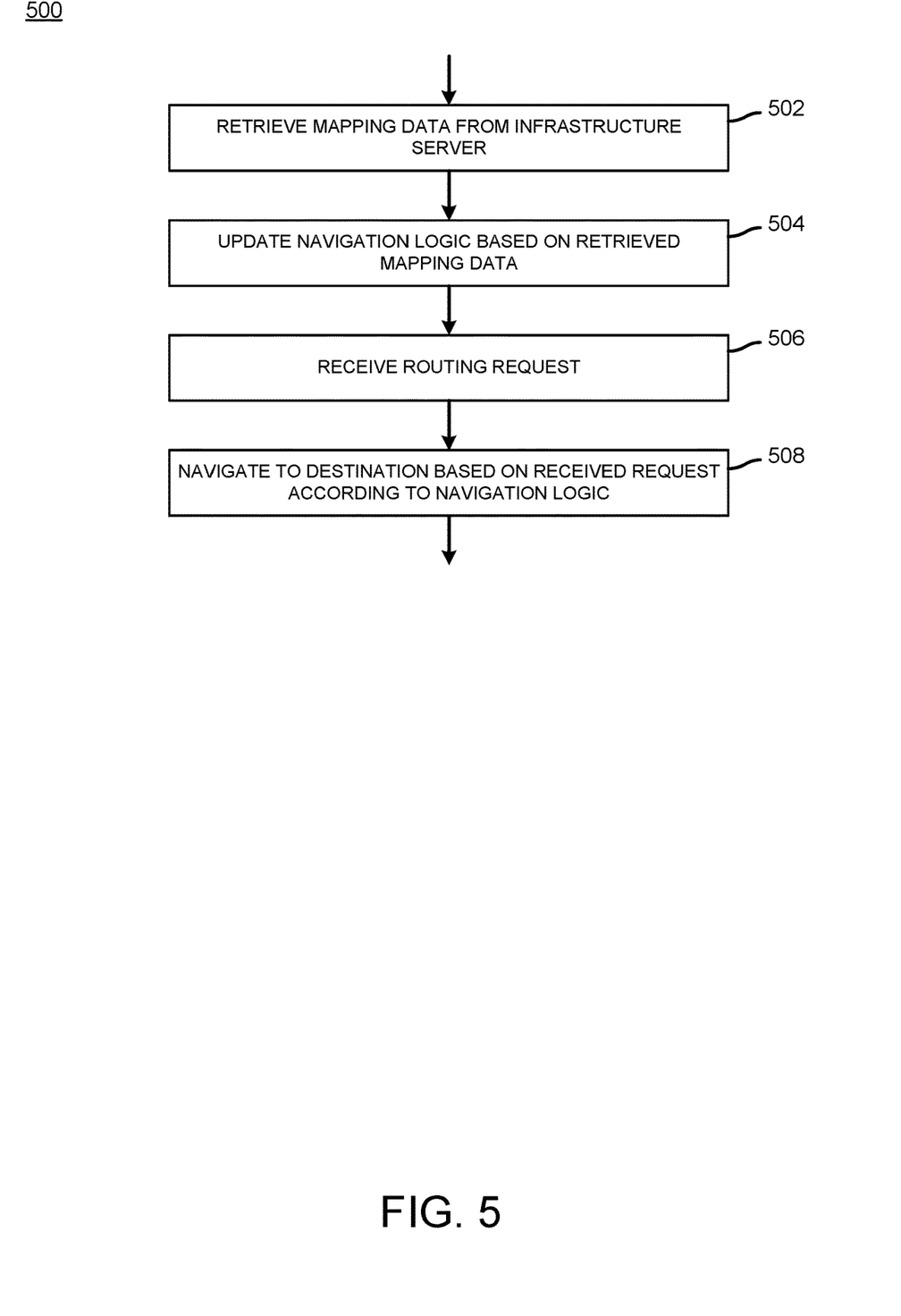
FIG. 5 illustrates a flow diagram of an example method for operating within the transportation network infrastructure described relative to FIG. 1, according to an embodiment.

Referring now to FIG. 5, an example method 500 for operating within the transportation network infrastructure by one of the drone devices 104. As shown, the method 500 begins in block 502, in which the drone device 104 retrieves mapping data from the infrastructure server 102. In block 504, the drone device 104 updates navigation logic based on retrieved mapping data. In block 506, the drone device 104 may receive a routing request (e.g., from a user). The routing request may, for example, pertain to a delivery workflow in which the drone device 104 is to deliver an item from a source location to a destination location. In an embodiment, such delivery schemes may follow models such as the Flirtey model (which uses a tether system to lower a given delivery item such that the drone device 104 is not required to land). In block 508, the drone device 104 may navigate to the destination location based on the received request according to the navigation logic. The navigation logic generally adheres to the transportation network infrastructure generated by the infrastructure server 102, e.g., such that the routes are guided along paths drawn from publicly available road map data adapted for the sky.

Terrestrially, half a trillion trips are potentially made throughout the year, which is higher than any amount that the Federal Aviation Administration oversees. The following provides additional examples that may be carried out in the embodiments presented above and also embodiments generally drawn to the broader inventive concept of providing an aerial transportation network infrastructure for aerial. The techniques described herein are decentralized and thus scalable. By scaling drone operations through the disclosed techniques, one trillion drone trips or more over a year may be achieved based on need.

SKYDOS: Drone Operating System

Objective & Method: "Pipes in the sky"—an innovation in the world of last mile and mesoscale freight delivery. SKYDOS will operate under present FAA guidelines. Broadly, present guidelines do not allow flying over buildings or people; therefore no landing of drones on buildings. Hence, only designated supply node takeoff and return should be used in SKYDOS.

HARDWARE: Electric propulsion Drones (2 sizes; 1 and 10 pound carrying capacity); Computers; "Cop" drones; 1:200 miniaturized drones+1:200 3D-printed model of city (Indianapolis or Chicago) for testing hardware and software; Wind-tunnel; Drone charging stations; Drone docking stations.

SOFTWARE: Real time operating system; terrestrial car simulation software Transmodeler™ adapted for SKYDOS drones simulation; mobile online SkydosFCC™ auctioning & licensing software developed internally; local, state and federal DOT maps (e.g., in Topologically Integrated Geographic Encoding and Referencing System (TIGER) file format) for 300 feet above ground air "pipes" licensing space identification & labeling (requires detailed city 3-D GIS maps of airspace that is generated in Transmodeler software).

A Real Time OS (SkydosRTOS™) is operable at one-tenth second with preemptive scheduling algorithms. Using the concept of a hybrid (or modular) kernel instead of merely a microkernel RTOS (µRTOS) or a monolithic one, both kernels may be leveraged. µRTOS, with message passing, Network Time Protocol (NTP) for network ports (and the like), and a Monolithic RTOS efficiency may be used. For message failure issues at the client end (the actual drones), a µRTOS would suffice. At the central SkyDOS a hybrid system could be implemented.

Generally, operating systems exist for drones. However, these general purpose operation systems are based on Euclidean geometry and can be a burden for SKYDOS. SKYDOS may use a planar topology of terrestrial systems. Such an approach uses a relatively simple but dedicated system with RTOS.

The voluminous amount of road segments that the simplified TIGER files, developed by USGS, US Census Bureau and USPS, provides a centerline topologically accurate road network upon which Google™ maps, HERE™, NAVMART™ etc. are based.

A network, by definition is a topological object that allows optimization of routes like shortest path (SP), traveling salesman problem (NP-Hard, or non polynomial hard problem). Time complexity is a problem with NP-Hard solutions since real time solutions may be difficult. However, robust heuristics are common for solutions to SP.

Stochastic Approximation

By introducing stochastic approximation, the path of all drones may be simulated ahead of time and also allow for adjustments. Techniques like Polyak averaging is used in applications (e.g., Transmodeler™ software) for simulating every tenth of a second, every drone, and reset the destination shortest path, by simulating ten shortest paths. For each drone, ten steps by ten shortest paths are simulated to create 100 routes per second for each drone. Since Level 5 automation is intended for SKYDOS drones, these 100 per second simulations, with real time monitoring eliminates accidents in ideal conditions.

Backup System: SkydosCOP™

SKYDOS may have a backup police-type OS that may navigate or "arrest" failed drones (weather, equipment failure, external interdiction, etc.). The backup system may use fixed and mobile sensors that will tract failure and rescue drone hardware. SKYDOS may have heavily equipped cop-drones that will envelope East-West-North-South azimuths with the failing drone in the center, and catch the drone with a fishnet type contraption and rescue to safety.

SkydosCOP™ may be operated by local law enforcement, similar to how present the traffic cop ecosystem works. However, since only registered and fully automated drones will fly, we may need law enforcement only for backup safety and investigate potential sabotage like terrorism and the like.

Revenue System: SkydosFCC

With present ADS-B FAA adoption of airspace for drones, it would be in unmitigated disaster to control airspace based on the Euclidean geometry of FAA. A controlled airspace mimicking a terrestrial road transport, but with full automation, a "road" network in the sky should be applied.

To do so, a 3D Electric Sky Transport Network with Level 5 Automation (electric drones) by "mirroring" an approximately fifty million road segment network topology into the sky at 300 feet (FAA designated airspace is 200-400 feet above ground) and auctioning airspace like FCC spectrums to limited licenses can be created. All terrestrial infrastructure may be adapted to avoid rediscovery of sophisticated transport infrastructure e.g. traffic cops, signage, signaling, parking, and so on.

SkydosFCC™ may provide an online software platform for buying airspace above 300 feet of every street/road segment in the United States. Approximately fifty million road segments with another approximate forty million road intersections in the US potentially requires a dedicated software system to auction licenses to airspace ("pipes in the sky") and provide revenue to local governments. This will ensure local acceptance and flexibility of adopting SKYDOS. Revenue from SKYDOS could more than offset losses from underuse of terrestrial freight transport (e.g. drones replacing trucks). Typical FCC auction of television and cellular spectrum may bring in billions of dollars to the federal government. However, since local government "owns" public roads and the airspace above it, this will be an strong public revenue source. The present road, rail, and air system entails a three trillion dollar transport GDP in the United States. Drones may affect this revenue structure when the paradigm finally shifts. SkydosFCC™ may provide a permanent "tax" base for local governments.

SkydosFCC™ may be standalone software and separate from the drone delivery real time OS, SKYDOS & SkydosCOP™.

SkydosNetScience™

SkydosNetScience™ is research software for researching and testing map three dimensional (3D) geometry and two dimensional (2D) planar topology of the road system and the dual "roads in the sky" system. Location Science, Operations Research, Stochastic Optimization, Integer Optimization etc. will be used to study the nature of terrestrial planar topology and related mathematical issues.

SkydosSIM™

SkydosSIM™ will be the simulation software built upon the commercially available software (e.g., Transmodeler™ from Caliper Corporation™). Since such software provides all the requirements for Level 5 full automation, SkydosSIM™ will provide the support computer programming and parameterization in the software to create the SKYDOS drone "highway" platform 300 feet above ground. Developing drone specifications and creating speed, acceleration, deceleration, turbulence etc., parameterization is already done. Drone shape and size based on standard one and ten pounds carrying capacity drones. More testing will be needed before final adoption. However, simulation experiments show realistic adoption since such software is already used for terrestrial simulation and for connected car real time transport coordination in major metros like Chicago, London, Los Angeles, and so on. Adopting such software for SKYDOS saves valuable time and energy that went into creating traffic simulation software, as the software provides relatively detailed and realistic traffic simulation and navigation support software.

SkydosTOY™

A "toy" version of SKYDOS may be used to test all of the above (except revenue sharing) at a 1:200 scale model of everything. This "toy" can be used for marketing SKYDOS and can have an integrated hardware and software component. A 3D printer to 3D print a city in 1:200 scale and also 1:200 drones with 3D printed circuits for these electric drones. "TOY" may demonstrate both typical and extreme situations like wind (with a 3D printed wind tunnel). A SkydosHUNT™

This shopping portal software will again be a standalone online portal to showcase SKYDOS. SkydosTOY™ will get automatic inquiries from "HUNT" and produce 1:200 scale prototypes for any local government or similar entity like a military base with a "fee".

SkydosAPP™ is a buyers portal in their mobile phones to buy goods as they do with any shopping portal. Delivery is done using Skydos.

MAINTAINENCE SERVICE: SkydosSIMS™ software (already developed) will demo full scaled-up version of reality (millions of scenarios simulated w/weather/failure etc. included).

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

A plurality of advantages of the present disclosure arise from the various features of the method, computer-readable storage medium, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

What is claimed is:

1. A method of routing a plurality of autonomous unmanned aerial vehicles on predetermined aerial paths of a predetermined two-dimensional aerial transportation network infrastructure, the method comprising:
retrieving mapping data associated with a ground transportation network infrastructure that comprises road segments that navigate around ground objects;
building, from the mapping data, an aerial topological model of a two-dimensional aerial transportation network infrastructure to establish the predetermined two-dimensional aerial transportation network infrastructure, the predetermined two-dimensional aerial transportation network infrastructure comprising predetermined aerial paths corresponds to at least a set of the road segments of the ground transportation network infrastructure so that the predetermined aerial paths navigate around one or more of the ground objects of the ground transportation network infrastructure; and
controlling a plurality of unmanned aerial vehicles that autonomously route, queue, and monitor themselves based on the predetermined aerial paths of the predetermined two-dimensional aerial transportation network infrastructure, and using a predetermined simulation of traffic, including queuing, to avoid issues between individual unmanned aerial vehicles sharing one or more of the predetermined aerial paths.

2. The method of claim 1, wherein the mapping data comprise publicly sourced mapping data.

3. The method of claim 1, further comprising pushing the aerial topological model to at least one of the plurality of unmanned aerial vehicles subscribing to updates.

4. The method of claim 1, further comprising:
providing a first unmanned aerial vehicle of the plurality of unmanned aerial vehicles with a navigation logic;
retrieving aerial topology data from an infrastructure server; and
updating the navigation logic of the first unmanned aerial vehicle based on the aerial topology data.

5. The method of claim 4, further comprising:
receiving with the first unmanned aerial vehicle a routing request indicating a source location and a destination location; and
navigating the first unmanned aerial vehicle to the destination location from the source location according to the navigation logic.

6. The method of claim 4, wherein the aerial topology data corresponds to the predetermined two-dimensional aerial transportation network infrastructure.

7. The method of claim 1, wherein the step of controlling the plurality of unmanned aerial vehicles comprises operating a software application to autonomously navigate the plurality of unmanned aerial vehicles in real time through the predetermined two-dimensional aerial transportation network infrastructure based on terrestrial navigation techniques.

8. The method of claim 7, wherein the step of controlling the plurality of unmanned aerial vehicles further comprises:
performing a real-time simulation model to predict a potential for an issue for a first unmanned aerial vehicle of the plurality of unmanned aerial vehicles within the predetermined two-dimensional aerial transportation network infrastructure; and
solving the potential for the issue prior to the issue occurring by applying measures to the first unmanned aerial vehicle based on the terrestrial navigation techniques.

9. The method of claim 1, wherein a first unmanned aerial vehicle of the plurality of unmanned aerial vehicles has an operating system that uses stochastic approximation techniques to predict traffic and interact with others of the plurality of unmanned aerial vehicles within the predetermined two-dimensional aerial transportation network infrastructure.

* * * * *